(12) United States Patent
Domyo et al.

(10) Patent No.: US 6,615,597 B1
(45) Date of Patent: Sep. 9, 2003

(54) REFRIGERATOR

(75) Inventors: Nobuo Domyo, Osaka (JP); Koichi Kita, Osaka (JP)

(73) Assignee: Daikin Industries, Ltd. (JP)

( * ) Notice: Subject to any disclaimer, the term of this patent is extended or adjusted under 35 U.S.C. 154(b) by 0 days.

(21) Appl. No.: 09/868,232

(22) PCT Filed: Dec. 15, 1999

(86) PCT No.: PCT/JP99/07036

§ 371 (c)(1),
(2), (4) Date: Jun. 15, 2001

(87) PCT Pub. No.: WO00/36347

PCT Pub. Date: Jun. 22, 2000

(30) Foreign Application Priority Data

Dec. 16, 1998 (JP) .............................. 10-357691

(51) Int. Cl.[7] .............................. F25B 13/00
(52) U.S. Cl. .................... 62/197; 62/324.6; 62/509
(58) Field of Search ............ 62/509, 203, 204, 62/197, 324.4, 324.1, 324.6, 160, 196.1

(56) References Cited

U.S. PATENT DOCUMENTS 5,524,449 A * 6/1996 Ueno et al. ............. 62/509 X
5,651,261 A * 7/1997 Nakajima et al. ......... 62/509 X

FOREIGN PATENT DOCUMENTS

| JP | 61-60066 | 4/1986 |
| JP | 5-118720 | 5/1993 |
| JP | 05-248740 A | 9/1993 |
| JP | 5-332625 | 12/1993 |
| JP | 6-257826 | 9/1994 |
| JP | 9-14782 | 1/1997 |

OTHER PUBLICATIONS

D.P. Grob, P.E., "Barries in the U.S.A. to Using Propane as a Refrigerant", ASHRAE/NIST Refrigerants Conference, pp. 109–114, Aug. 1993.

* cited by examiner

Primary Examiner—Harry B. Tanner
(74) Attorney, Agent, or Firm—Nixon Peabody LLP; Donald R. Studebaker

(57) ABSTRACT

A bridge circuit (11) having four check valves (31, 32, 33, 34) is provided upstream of a receiver (10), which is provided upstream of an expansion valve (7). A gas vent pipe (12) for connecting the receiver (10) and a pipe (24) downstream of the expansion valve (7) to each other is provided, and the gas vent pipe (12) is provided with a gas vent valve (13). Upon shut down, the gas vent valve (13) is opened, and the expansion valve (7) is gradually closed. The compressor (4) is shut down and the gas vent valve (13) is closed after passage of a predetermined time from the point in time when the expansion valve (7) reaches the fully closed state.

14 Claims, 11 Drawing Sheets

REFRIGERATOR

TECHNICAL FIELD

The present invention relates to a refrigeration system, and more particularly to a technique for reducing the amount of refrigerant remaining on the indoor side by trapping the refrigerant on the outdoor side when the system is shut down.

BACKGROUND ART

A refrigeration system known in the art having an outdoor unit and an indoor unit connected to each other via communication pipes is designed to trap the refrigerant on the outdoor unit side when refrigerant leakage is detected and when the system is shut down in order to prevent the refrigerant from leaking into the room. For example, Japanese Laid-Open Patent Publication No. 5-118720 discloses a refrigeration system which performs a pump down operation for trapping the refrigerant on the outdoor unit side in the event of refrigerant leakage.

A conventional refrigeration system which traps the refrigerant in the indoor unit will be described with reference to FIG. 12. The refrigeration system includes electromagnetic valves (108) and (109) along communication pipes (113) separately from stop valves (106) and (107) for closing an outdoor unit (111) before connecting the outdoor unit (111) and an indoor unit (112) to each other.

During a cooling operation, the refrigerant discharged from a compressor (101) circulates as it passes through a four-way switching valve (102), is condensed through an outdoor heat exchanger (103), depressurized through an electric expansion valve (104) and evaporated through an indoor heat exchanger (105), and then returns to the compressor (101) via the four-way switching valve (102). When the system is shut down, the electromagnetic valve (109) on the liquid side (the high pressure side) is first closed while leaving the compressor (101) operating. Thus, the pressure on the low pressure side of the refrigerant circuit gradually decreases, and a low pressure switch (114) is eventually activated to shut down the compressor (101). Simultaneously with the shut down of the compressor (101), the electromagnetic valve (108) on the gas side (the low pressure side) is closed to close the outdoor unit (111), thereby trapping the refrigerant in the outdoor unit (111). Through such a pump down operation, substantially no refrigerant exists in the indoor unit (112), thereby avoiding leakage of a large amount of refrigerant into the room.

On the other hand, during a heating operation, the refrigerant discharged from the compressor (101) circulates as it passes through the four-way switching valve (102), is condensed through the indoor heat exchanger (105), depressurized through the electric expansion valve (104) and evaporated through the outdoor heat exchanger (103), and then returns to the compressor (101) via the four-way switching valve (102). When the system is shut down, the state of the four-way switching valve (102) is first switched to another so as to change the circulation path of the refrigerant to that in the cooling operation described above. Then, an operation as the pump down operation in the cooling operation is performed.

However, in the conventional refrigeration system described above, it is necessary to provide the electromagnetic valves (108) and (109) respectively for the communication pipes (113) and (113), and these electromagnetic valves (108) and (109) cause an increase in the cost of the system.

Moreover, when performing the pump down operation in a heating operation, the four-way switching valve (102) needs to be switched before performing a refrigerant circulation operation as that in a cooling operation, which lowers the efficiency of the system and may even detract from the comfort in the room.

Especially, where a slightly flammable refrigerant such as R32 or R32/134a is used as the refrigerant, it is particularly desired that the refrigerant is confined in the outdoor unit when the system is shut down because there is a risk of ignition due to the combustion of the refrigerant.

The present invention has been made in view of the above and aims to provide a refrigeration system capable of trapping the refrigerant on the outdoor side while maintaining the high efficiency and the comfort.

DISCLOSURE OF THE INVENTION

In order to achieve the above-described object, the present invention is designed so that a refrigerant of an indoor unit is trapped in an outdoor unit without switching the circulation direction of the refrigerant discharged from a compressor when shutting down either a cooling operation or a heating operation.

Specifically, a refrigeration system according to the present invention includes: an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed; an indoor unit (2) including an indoor heat exchanger (8); and a communication pipe (3) for connecting the outdoor unit (1) and the indoor unit (2) to each other, wherein: the outdoor unit (1) includes: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); and the refrigeration system further includes control means (35) for, before shutting down the compressor (4), opening the gas vent opening/closing means (13) and closing the expansion valve (7) while the compressor (4) is left operating, and for closing the gas vent opening/closing means (13) upon subsequent shut down of the compressor (4).

With the above arrangement, either in a cooling operation or in a heating operation, the condensed refrigerant will be expanded through the expansion valve (7) after passing through the receiver (10). Moreover, the backflow of refrigerant running from the receiver (10) to the bridge circuit (11) is prevented. Therefore, when shutting down either of these operations, the refrigerant is trapped in the receiver (10) by closing the expansion valve (7) without switching the flow path switching mechanism (5).

Because the expansion valve (7) is closed before the compressor (4) is shut down, the refrigerant is trapped in the receiver (10). At this time, since the gas vent opening/closing means (13) is opened, the gas refrigerant in the receiver (10) is discharged through the gas vent passageway (12), whereby the liquid refrigerant is efficiently stored in the receiver (10). Then, when the compressor (4) is shut down based on a predetermined condition, the gas vent opening/closing means (13) is closed, and the receiver (10) and the vicinity thereof are enclosed with the refrigerant being trapped therein. In this way, the refrigerant is collected into the outdoor unit (1) while the backflow thereof into the indoor unit (2) is prevented, thereby reducing the amount of refrigerant remaining in the indoor unit (2). Note that the control means (35) may be configured so as to start its control operation based on a predetermined shut down instruction such as, for example, a shut down instruction from the user turning OFF the system, turning OFF of a thermostat, or activation of a protection device.

Note that while it is particularly preferred that the time when the gas vent opening/closing means (13) is closed is simultaneous with the shut down of the compressor (4), they may not be simultaneous. Thus, the gas vent opening/closing means (13) may be closed prior to the shut down of the compressor (4), or it may be closed after passage of a short period of time from the shut down of the compressor (4).

Another refrigeration system according to the present invention includes: an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed; an indoor unit (2) including an indoor heat exchanger (8); and a communication pipe (3) for connecting the outdoor unit (1) and the indoor unit (2) to each other, wherein: the outdoor unit (1) includes: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); auxiliary opening/closing means (36) which is always opened during a normal operation is provided on an outdoor side of a gas side pipe (26) extending from the indoor unit (2) to the flow path switching mechanism (5); and the refrigeration system further includes control means (35) for, before shutting down the compressor (4) in a cooling operation, opening the gas vent opening/closing means (13) and closing the expansion valve (7) while the compressor (4) is left operating, and for closing the gas vent opening/closing means (13) and the auxiliary opening/closing means (36) upon subsequent shut down of the compressor (4).

With the above arrangement, since the auxiliary opening/closing means (36) is closed upon shut down, the path on the outdoor heat exchanger (6) side of the auxiliary opening/closing means (36) is also enclosed, whereby the refrigerant is trapped not only in the receiver (10) but also in the outdoor heat exchanger (6) and the compressor (4). Therefore, the amount of refrigerant collected into the outdoor unit (1) increases, and the amount of refrigerant remaining in the indoor unit (2) is reduced.

Note that while the refrigerant tends not to flow out to the indoor side when the compressor (4) is a low pressure dome type compressor, the refrigerant tends to flow out to the indoor side when the compressor (4) is a high pressure dome type compressor, in which case the effect of providing the auxiliary opening/closing means (36) is more pronounced.

Another refrigeration system according to the present invention includes: an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed; an indoor unit (2) including an indoor heat exchanger (8); and a communication pipe (3) for connecting the outdoor unit (1) and the indoor unit (2) to each other, wherein: the outdoor unit (1) includes: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); auxiliary opening/closing means (36) which is always opened during a normal operation is provided on an outdoor side of a gas side pipe (26) extending from the indoor unit (2) to the flow path switching mechanism (5); the refrigeration system further includes temperature difference detection means (37, 38) for detecting a temperature difference between an indoor side and an outdoor side; and the refrigeration system further includes control means (35) for, before shutting down the compressor (4) in a heating operation, opening the gas vent opening/closing means (13) and closing the expansion valve (7) while the compressor (4) is left operating, and for closing the gas vent opening/closing means (13) and the auxiliary opening/closing means (36) when an outdoor temperature becomes equal to or greater than an indoor temperature after subsequent shut down of the compressor (4).

With the above arrangement, before the compressor (4) is shut down, the gas vent opening/closing means (13) is opened and the expansion valve (7) is closed, whereby the refrigerant is efficiently trapped in the receiver (10). Then, even after the compressor (4) is shut down, the refrigerant of the indoor unit (2) flows into the outdoor unit (1) if the indoor temperature is higher than the outdoor temperature. Therefore, in order to further collect the refrigerant of the indoor unit (2) into the outdoor unit (1), the gas vent opening/closing means (13) and the auxiliary opening/closing means (36) are left open. Then, when the outdoor temperature becomes equal to or greater than the indoor temperature, the gas vent opening/closing means (13) and the auxiliary opening/closing means (36) are closed so as to enclose the refrigerant in the receiver (10), the outdoor heat exchanger (6), the compressor (4) and the pipes connecting these elements to one another.

The auxiliary opening/closing means (36) may be configured so that the auxiliary opening/closing means (36) can be manually opened/closed, and may be used also as a stop valve (15) for closing the outdoor unit (1) before connecting the outdoor unit (1) to the indoor unit (2).

With the above arrangement, it is not necessary to separately provide the stop valve (15) for closing the outdoor unit (1) before connecting the outdoor unit (1) and the indoor unit (2) to each other, thereby reducing the cost of the system.

Another refrigeration system according to the present invention includes a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6), wherein: at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; and a path (K3) along the gas vent passageway (12) extending from the receiver (10) to the gas vent opening/closing means (13); and the refrigeration system further includes control means (35) for, before shutting down the compressor (4), opening the gas vent opening/closing means (13) and closing the expansion valve (7) while the compressor (4) is left operating, and for closing the gas vent opening/closing means (13) upon subsequent shut down of the compressor (4).

With the above arrangement, the expansion valve (7) is closed before the compressor (4) is shut down, whereby the refrigerant is trapped in the receiver (10). At this time, since the gas vent opening/closing means (13) is opened, the gas refrigerant in the receiver (10) is discharged through the gas vent passageway (12), whereby the liquid refrigerant is efficiently stored in the receiver (10). Then, when the compressor (4) is shut down, the gas vent opening/closing means (13) is closed, and the refrigerant is trapped in the receiver (10) and the paths (23), (K1), (K2) and (K3). In this way, the refrigerant is collected to the outdoor side while the backflow thereof to the indoor side is prevented, thereby reducing the amount of refrigerant remaining on the indoor side.

Another refrigeration system according to the present invention includes a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); and auxiliary opening/closing means (36) provided on an outdoor side of a gas side pipe (26) extending from indoor heat exchanger (8) to the flow path switching mechanism (5), the auxiliary opening/closing means (36) being always opened during a normal operation, wherein: at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further includes control means (35) for, before shutting down the compressor (4), opening the gas vent opening/closing means (13) and closing the expansion valve (7) while the compressor (4) is left operating, and for closing the gas vent opening/closing means (13) and the auxiliary opening/closing means (36) upon subsequent shut down of the compressor (4).

With the above arrangement, since the auxiliary opening/closing means (36) is closed upon shut down, the path on the outdoor heat exchanger (6) side of the auxiliary opening/closing means (36) is also enclosed, whereby the refrigerant is trapped not only in the receiver (10) but also in the outdoor heat exchanger (6) and the compressor (4). Therefore, the amount of refrigerant collected to the outdoor side increases, and the amount of refrigerant remaining on the indoor side is reduced.

Another refrigeration system according to the present invention includes a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); auxiliary opening/closing means (36) provided on an outdoor side of a gas side pipe (26) extending from indoor heat exchanger (8) to the flow path switching mechanism (5), the auxiliary opening/closing means (36) being always opened during a normal operation; and temperature difference detection means (37, 38) for detecting a temperature difference between an indoor side and an outdoor side, wherein: at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further includes control means (35) for, before shutting down the compressor (4) in a heating operation, opening the gas vent opening/closing means (13) and closing the expansion valve (7) while the compressor (4) is left operating, and for closing the gas vent opening/closing means (13) and the auxiliary opening/closing means (36) when an outdoor temperature becomes equal to or greater than an indoor temperature after subsequent shut down of the compressor (4).

With the above arrangement, before the compressor (4) is shut down, the gas vent opening/closing means (13) is opened and the expansion valve (7) is closed, whereby the refrigerant is efficiently trapped in the receiver (10). Then, even after the compressor (4) is shut down, the refrigerant on the indoor side flows to the outdoor side if the indoor temperature is higher than the outdoor temperature. Therefore, in order to further collect the refrigerant on the indoor side to the outdoor side, the gas vent opening/closing means (13) and the auxiliary opening/closing means (36) are left open. Then, when the outdoor temperature becomes equal to or greater than the indoor temperature, the gas vent opening/closing means (13) and the auxiliary opening/closing means (36) are closed so as to enclose the refrigerant in the receiver (10), the outdoor heat exchanger (6), the compressor (4) and the paths.

Another refrigeration system according to the present invention includes a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); auxiliary opening/closing means (36) provided on an outdoor side of a gas side pipe (26) extending from indoor heat exchanger (8) to the flow path switching mechanism (5), the auxiliary opening/closing means (36) being always opened during a normal operation; and an outdoor fan (9) for supplying an air to the outdoor heat exchanger (6), wherein: at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further includes control means (35) for, before shutting down the compressor (4) in a heating operation, opening the gas vent opening/closing means (13) and closing the expansion valve (7) while the compressor (4)

is left operating, for closing the auxiliary opening/closing means (36) upon subsequent shut down of the compressor (4), and for closing the gas vent opening/closing means (13) upon shut down of the outdoor fan (9).

With the above arrangement, before the compressor (4) is shut down, the gas vent opening/closing means (13) is opened and the expansion valve (7) is closed, whereby the refrigerant is efficiently trapped in the receiver (10). Then, when the compressor (4) is shut down, the auxiliary opening/closing means (36) is closed. Since the refrigerant is condensed through the outdoor heat exchanger (6) while the outdoor fan (9) is left operating, and the gas vent opening/closing means (13) is opened, the refrigerant on the indoor side flows to the outdoor side through the gas vent passageway (12). Therefore, the amount of refrigerant collected to the outdoor side increases. Then, upon shut down of the outdoor fan (9), the gas vent opening/closing means (13) is closed, whereby the refrigerant is enclosed in the receiver (10), the outdoor heat exchanger (6), the compressor (4) and the paths.

The bridge circuit (11) may include: a first check valve (31) for allowing only a refrigerant flow running in a direction from a first connection terminal (11a) connected to the outdoor heat exchanger (6) to a second connection terminal (11b) connected to the receiver (10); a second check valve (32) for allowing only a refrigerant flow running in a direction from a third connection terminal (11c) connected to the indoor heat exchanger (8) to the second connection terminal (11b); a third check valve (33) for allowing only a refrigerant flow running in a direction from a fourth connection terminal (11d) connected to a downstream side pipe (24) of the expansion valve (7) to the third connection terminal (11c); and a fourth check valve (34) for allowing only a refrigerant flow running in a direction from the fourth connection terminal (11d) to the first connection terminal (11a).

With the above arrangement, during a cooling operation, the refrigerant, which has been condensed through the heat exchanger (6), passes through the first check valve (31) and flows into the receiver (10), and the refrigerant, which has been depressurized through the expansion valve (7), passes through the third check valve (33) and is evaporated through the indoor heat exchanger (8). During a heating operation, the refrigerant, which has been condensed through the indoor heat exchanger (8), passes through the second check valve (32) and flows into the receiver (10), and the refrigerant, which has been depressurized through the expansion valve (7), passes through the fourth check valve (34) and is evaporated through the outdoor heat exchanger (6). In either operation, the backflow of refrigerant from the receiver (10) is prevented by the first check valve (31) and the second check valve (32), and by closing the expansion valve (7) and the gas vent opening/closing means (13), the receiver (10) and the vicinity thereof are enclosed, thereby trapping the refrigerant therein.

The flow path switching mechanism (5) may be an electric ball-valve-type four-way switching valve (5A).

With the above arrangement, the refrigerant leakage between the high pressure side and the low pressure side is considerably reduced, whereby it is possible to reliably prevent the refrigerant, which has once been trapped on the outdoor side, from being discharged to the indoor side.

Another refrigeration system according to the present invention includes a compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and backflow preventing means (31) provided upstream of the receiver (10) for allowing only a refrigerant flow running from the outdoor heat exchanger (6) to the receiver (10), wherein: at least a path extending from the backflow preventing means (31) to the expansion valve (7) via the receiver (10), and a path along the gas vent passageway (12) extending from the receiver (10) to the gas vent opening/closing means (13) are provided on an outdoor side; and the refrigeration system further includes control means (35) for, before shutting down the compressor (4), opening the gas vent opening/closing means (13) and closing the expansion valve (7) while the compressor (4) is left operating, and for closing the gas vent opening/closing means (13) upon subsequent shut down of the compressor (4).

With the above arrangement, even in a refrigeration system that does not require a bridge circuit such as, for example, a cooling only system, the refrigerant is effectively trapped on the outdoor side by opening/closing the gas vent opening/closing means (13).

Another refrigeration system according to the present invention includes a compressor (4), an outdoor heat exchanger (6), an expansion valve (7) capable of being fully closed, and an indoor heat exchanger (8), which are connected to one another by a refrigerant pipe, the refrigeration system further including: a receiver (10) provided upstream of the expansion valve (7); a gas vent passageway (12) for connecting the receiver (10) and a downstream side pipe (24) of the expansion valve (7) to each other; gas vent opening/closing means (13) provided along the gas vent passageway (12); and auxiliary opening/closing means provided upstream of the receiver (10), the auxiliary opening/closing means being always opened during a normal operation, wherein: at least a path extending from the auxiliary opening/closing means to the expansion valve (7) via the receiver (10), and a path along the gas vent passageway (12) extending from the receiver (10) to the gas vent opening/closing means (13) are provided on an outdoor side; and the refrigeration system further includes control means (35) for, before shutting down the compressor (4), opening the gas vent opening/closing means (13) and closing the expansion valve (7) while the compressor (4) is left operating, and for closing the gas vent opening/closing means (13) and the auxiliary opening/closing means upon subsequent shut down of the compressor (4).

With the above arrangement, even in a refrigeration system that does not require a bridge circuit such as, for example, a cooling only system, the refrigerant is effectively trapped on the outdoor side by opening/closing the gas vent opening/closing means (13) and the auxiliary opening/closing means.

Backflow preventing means (46) for allowing only a refrigerant flow in a direction in which the refrigerant is discharged from the compressor (4) may be provided on a discharge side of the compressor (4).

With the above arrangement, the downstream side of the check valve (46) is also closed upon shut down, whereby the refrigerant is trapped not only in the receiver (10) but also in the outdoor heat exchanger (6). Therefore, the amount of refrigerant collected to the outdoor side increases, and the amount of refrigerant remaining on the indoor side is reduced.

Backflow preventing means (46) for allowing only a refrigerant flow in a direction in which the refrigerant is sucked into the compressor (4) may be provided on a suction side of the compressor (4).

With the above arrangement, the upstream side of the check valve (46) is also closed upon shut down, whereby the refrigerant is trapped not only in the receiver (10) but also in the outdoor heat exchanger (6) and the compressor (4). Therefore, the amount of refrigerant collected to the outdoor side increases, and the amount of refrigerant remaining on the indoor side is reduced.

The auxiliary opening/closing means (36) may be an electric ball valve (40).

With the above arrangement, the pressure loss of the refrigerant at the auxiliary opening/closing means (36) is reduced, thereby improving the efficiency of collecting the refrigerant.

The control means (35) may be configured so as to shut down the compressor (4) when a fully closed state of the expansion valve (7) has continued for a predetermined period of time.

With the above arrangement, since the compressor (4) is shut down based on the amount of time for which the expansion valve (7) is fully closed, the control operation is simplified.

A low pressure switch (30) may be provided along a suction side pipe (28) of the compressor (4); and the control means (35) may be configured so as to shut down the compressor (4) when the low pressure switch (30) is activated.

With the above arrangement, since the compressor (4) is shut down based on activation of the low pressure switch (30), the refrigerant of the indoor unit (2) is reliably collected and the control operation is simplified.

Note that the refrigerant may include a flammable refrigerant. The term "flammable refrigerant" as used herein includes an HC-based refrigerant such as propane and a slightly flammable refrigerant such as HFC32.

With the above arrangement, since such a refrigerant including a flammable refrigerant necessitates a strict refrigerant leakage control, the effect of trapping a large amount of refrigerant on the outdoor side is more pronounced.

As described above, according to the present invention, the refrigerant can be efficiently trapped on the outdoor side only by closing the expansion valve without switching the flow path switching mechanism. Moreover, the refrigerant can be efficiently trapped in the receiver by leaving open the gas vent opening/closing means provided along the gas vent passageway starting from the shut down of the system until the shut down of the compressor. Therefore, it is possible to reduce the amount of refrigerant remaining on the indoor side. Moreover, even in the case of a system that is not provided with a flow path switching mechanism, the refrigerant can be effectively trapped on the outdoor side by providing the backflow preventing means on the upstream side of the receiver.

Where the backflow preventing means is provided on the discharge side or the suction side of the compressor, the downstream side of the backflow preventing means is also closed upon shut down, whereby the refrigerant can be trapped not only in the receiver but also in the outdoor heat exchanger. As a result, it is possible to further reduce the amount of refrigerant remaining on the indoor side.

Where the auxiliary opening/closing means which is always opened during a normal operation is provided, a section extending on the outdoor heat exchanger side of the auxiliary opening/closing means is also enclosed, whereby the refrigerant can be trapped not only in the receiver but also in the outdoor heat exchanger and the compressor. Therefore, it is possible to increase the amount of refrigerant collected to the outdoor side and to further reduce the amount of refrigerant remaining on the indoor side.

Where the auxiliary opening/closing means is configured so that it can be manually opened/closed, and is used also as the stop valve, it is not necessary to separately provide the stop valve, thereby reducing the cost of the system.

Where the auxiliary opening/closing means is an electric ball valve, the pressure loss of the refrigerant is reduced, thereby improving the efficiency of collecting the refrigerant.

Where the flow path switching mechanism is an electric ball-valve-type four-way switching valve, the refrigerant leakage between the high pressure side and the low pressure side is considerably reduced, whereby it is possible to reliably prevent the refrigerant, which has once been trapped on the outdoor side, from being discharged to the indoor side.

Where there is provided control means for, before shutting down the compressor, opening the gas vent opening/closing means and closing the expansion valve while the compressor is left operating, and for closing the gas vent opening/closing means and the auxiliary opening/closing means upon subsequent shut down of the compressor, the refrigerant on the indoor side flows to the outdoor side through the gas vent passageway even after the shut down of the compressor, whereby a large amount of refrigerant can be enclosed in the receiver, the outdoor heat exchanger, the compressor and the pipes connecting these elements to one another.

Where there is provided control means for, before shutting down the compressor in a heating operation, opening the gas vent opening/closing means and closing the expansion valve while the compressor is left operating, and for closing the gas vent opening/closing means and the auxiliary opening/closing means when the outdoor temperature becomes equal to or greater than the indoor temperature after subsequent shut down of the compressor, the natural circulation of the refrigerant can be maximally utilized, whereby it is possible to further increase the amount of refrigerant to be collected to the outdoor side.

Where an expansion valve capable of being fully closed is used, and the control means is configured so as to shut down the compressor when the fully closed state of the expansion valve has continued for a predetermined period of time, the refrigerant can be collected smoothly and the control operation can be simplified.

Where an expansion valve capable of being fully closed is used, with a low pressure switch being provided along the suction side pipe of the compressor, and the control means being configured so as to shut down the compressor when the low pressure switch is activated, the refrigerant can be collected smoothly, and since the compressor is shut down based on activation of the low pressure switch, the reliable collection of the indoor side refrigerant is facilitated and the control operation can be simplified.

Note that where a refrigerant including a flammable refrigerant is used, the various effects described above are more pronounced.

BRIEF DESCRIPTION OF THE DRAWINGS

FIG. 11 shows cross-sectional views taken along line A—A of FIG. 10, wherein

BEST MODE FOR CARRYING OUT THE INVENTION

Embodiments of the present invention will now be described with reference to the drawings.

First Embodiment

Figure 1:
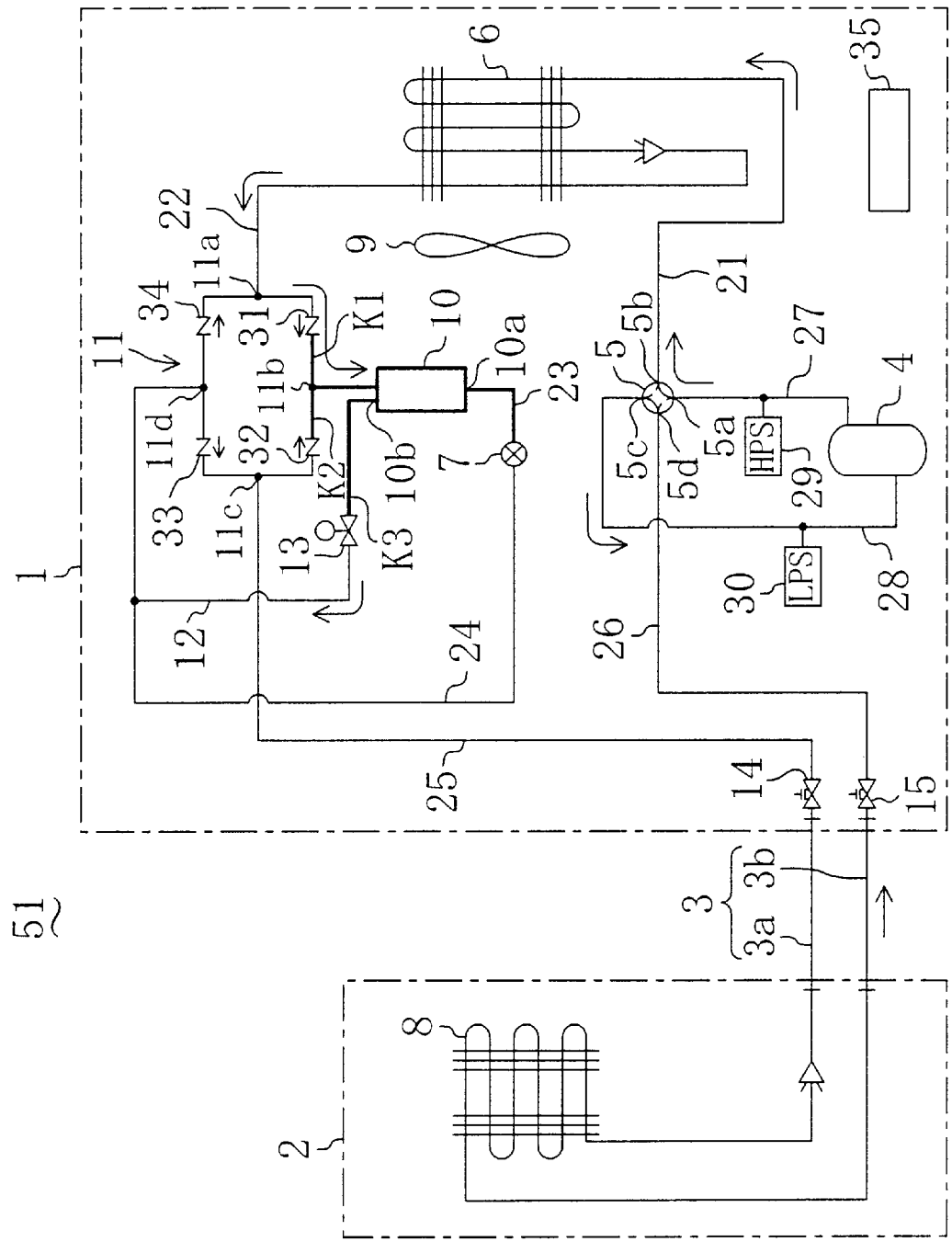
FIG. 1 is a diagram illustrating a configuration of a refrigeration system according to the first embodiment.

As illustrated in FIG. 1, a refrigeration system (51) according to the first embodiment includes an outdoor unit (1) provided on the outdoor side, an indoor unit (2) provided on the indoor side, and communication pipes (3) connecting the outdoor unit (1) and the indoor unit (2) to each other.

First, the configuration of the outdoor unit (1) will be described. A discharge side pipe (27) of a compressor (4) is connected to a first port (5a) of a four-way switching valve (5), and a suction side pipe (28) of the compressor (4) is connected to a third port (5c) of the four-way switching valve (5). The discharge side pipe (27) is provided with a high pressure switch (29), and the suction side pipe (28) is provided with a low pressure switch (30).

A second port (5b) of the four-way switching valve (5) is connected to one end of an outdoor heat exchanger (6) via a pipe (21). The other end of the outdoor heat exchanger (6) is connected to a first connection terminal (11a) of a bridge circuit (11) via a pipe (22).

The bridge circuit (11) includes a first check valve (31), a second check valve (32), a third check valve (33), and a fourth check valve (34). The bridge circuit (11) is provided with the first connection terminal (11a), a second connection terminal (11b), a third connection terminal (11c), and a fourth connection terminal (11d). The first check valve (31) is provided between the first connection terminal (11a) and the second connection terminal (11b), and is disposed so as to only allow a refrigerant flow running in the direction from the first connection terminal (11a) to the to second connection terminal (11b). The second check valve (32) is provided between the second connection terminal (11b) and the third connection terminal (11c), and is disposed so as to only allow a refrigerant flow running in the direction from the third connection terminal (11c) to the second connection terminal (11b). The third check valve (33) is provided between the third connection terminal (11c) and the fourth connection terminal (11d), and is disposed so as to only allow a refrigerant flow running in the direction from the fourth connection terminal (11d) to the third connection terminal (11c). The fourth check valve (34) is provided between the first connection terminal (11a) and the fourth connection terminal (11d), and is disposed so as to only allow a refrigerant flow running in the direction from the fourth connection terminal (11d) to the first connection terminal (11a).

A receiver (10) is connected to the second connection terminal (11b) of the bridge circuit (11). One end of a pipe (23) is connected to a liquid outlet (10a) of the receiver (10). The upstream side of an electric expansion valve (7) is connected to the other end of the pipe (23). One end of a pipe (24) is connected to the downstream side of the electric expansion valve (7). The other end of the pipe (24) is connected to the fourth connection terminal (11d) of the bridge circuit (11). A gas vent pipe (12), which is connected to a gas outlet (10b) of the receiver (10), is connected to a certain point along the pipe (24). The gas vent pipe (12) is provided with a gas vent valve (13), which is an electromagnetic valve.

The third connection terminal (11c) of the bridge circuit (11) is connected to a stop valve (14) via a pipe (25). A fourth port (5d) of the four-way switching valve (5) is connected to a stop valve (15) via a pipe (26). Note that these stop valves (14) and (15) are valves provided for the purpose of closing the outdoor unit (1) before connecting the outdoor unit (1) and the indoor unit (2) to each other via the communication pipes (3), i.e., before assembling the refrigeration system.

The outdoor heat exchanger (6) is provided with an outdoor fan (9) for supplying the outdoor air to the outdoor heat exchanger (6).

The indoor unit (2) is provided with an indoor heat exchanger (8). One end of the indoor heat exchanger (8) is connected to the stop valve (14) via a first communication pipe (3a). The other end of the indoor heat exchanger (8) is connected to the stop valve (15) via a second communication pipe (3b). Note that although not shown in the figure, an indoor fan for supplying the indoor air to the indoor heat exchanger (8) is housed in the indoor unit (2).

Moreover, the present refrigeration system is provided with a controller (35) as control means for performing various control operations to be described later.

Normal Operation

Next, a refrigerant circulation operation will be described. During a cooling operation, the four-way switching valve (5) is set in a position indicated by a solid line in the figure. Specifically, the four-way switching valve (5) is set in a position where the first port (5a) and the second port (5b) are connected to each other while the third port (5c) and the fourth port (5d) are connected to each other. The gas vent valve (13) is closed. The refrigerant discharged from the compressor (4) passes through the four-way switching valve (5), is condensed through the outdoor heat exchanger (6), passes through the first check valve (31) of the bridge circuit (11), and flows into the receiver (10). The refrigerant in the receiver (10) is depressurized through the electric expansion valve (7), passes through the third check valve (33) of the bridge circuit (11), runs through the first communication pipe (3a), flows into the indoor heat exchanger (8), and is evaporated through the indoor heat exchanger (8), thereby cooling the indoor air. The refrigerant which has flown out of the indoor heat exchanger (8) runs through the second communication pipe (3b), passes through the four-way switching valve (5), and is sucked into the compressor (4).

On the other hand, during a heating operation, the four-way switching valve (5) is set in a position indicated by a broken line in the figure. Specifically, the four-way switching valve (5) is set in a position where the first port (5a) and the fourth port (5d) are connected to each other while the second port (5b) and the third port (5c) are connected to each other. The gas vent valve (13) is closed. The refrigerant discharged from the compressor (4) passes through the four-way switching valve (5), runs through the second communication pipe (3b), and flows into the indoor heat exchanger (8). The refrigerant is condensed through the indoor heat exchanger (8), thereby heating the indoor air.

The refrigerant which has flown out of the indoor heat exchanger (8) runs through the first communication pipe (3a), passes through second check valve (32) of the bridge circuit (11), and flows into the receiver (10). The refrigerant in the receiver (10) is depressurized through the electric expansion valve (7), passes through the fourth check valve (34) of the bridge circuit (11), and is evaporated through the outdoor heat exchanger (6). The refrigerant which has flown out of the outdoor heat exchanger (6) passes through the four-way switching valve (5), and is sucked into the compressor (4).

As described above, in the present refrigeration system, the refrigerant, which has been condensed through the heat exchanger (6) or (8), flows into the receiver (10) after passing through the bridge circuit (11), and is depressurized through the electric expansion valve (7) after flowing out of the receiver (10), in either one of a cooling operation and a heating operation (normal operations).

Pump Down Operation

Next, a pump down operation for trapping the refrigerant in the outdoor unit (1) will be described. The pump down operation may be performed when the refrigeration system is shut down by the user or when refrigerant leakage is detected by a sensor (not shown) provided in the room for detecting refrigerant leakage. Various control operations of the pump down operation will now be described. Note that arrows in FIG. 1 indicate the direction in which the refrigerant circulates during the pump down operation in a cooling operation.

First Control Operation

Figure 2:
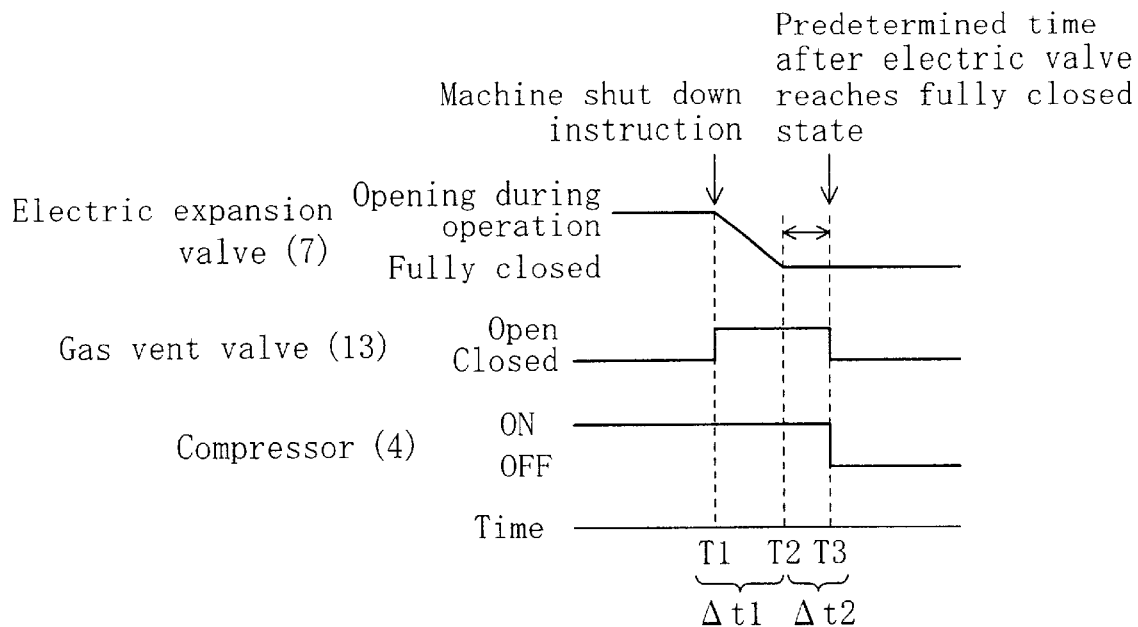
FIG. 2 is a timing chart illustrating a first control operation.

The first control operation will be described with reference to the timing chart of FIG. 2. The first control operation is a control operation that is applied to both a cooling operation and a heating operation.

In the first control operation, upon receiving a predetermined shut down signal (time T1), the controller (35) opens the gas vent valve (13), and gradually decreases the opening of the electric expansion valve (7) so that it is fully closed after passage of a predetermined time $Δt1$ (time T2). Note that the compressor (4) is left operating.

When the electric expansion valve (7) reaches the fully closed state, the liquid refrigerant in the receiver (10) is prohibited from flowing out of the receiver (10) while the gas refrigerant in the receiver (10) is allowed to flow out through the gas vent pipe (12), whereby the liquid refrigerant is trapped in the receiver (10). Therefore, the refrigerant of the indoor unit (2) is efficiently collected into the receiver (10) within a short period of time.

Then, after passage of a predetermined time $Δt2$ from the point in time when the electric expansion valve (7) reaches the fully closed state (time T3), the compressor (4) is shut down and the gas vent valve (13) is closed.

In this way, the refrigerant is prohibited from flowing out of the receiver (10), and the refrigerant is enclosed within the receiver (10) and the pipes in the vicinity of the receiver (10). Specifically, the refrigerant is enclosed within an extent (indicated by a bold line in FIG. 1) that is delimited by the first check valve (31) and the second check valve (32) of the bridge circuit (11), the gas vent valve (13) of the gas vent pipe (12), and the electric expansion valve (7) of the pipe (23).

In other words, the refrigerant is trapped in the receiver (10), the path (23) extending from the receiver (10) to the expansion valve (7), a path (K1) extending from the first check valve (31) to the receiver (10), a path (K2) extending from the second check valve (32) to the receiver (10), and a path (K3) along the gas vent pipe (12) extending from the receiver (10) to the gas vent valve (13).

Second Control Operation

Figure 3:
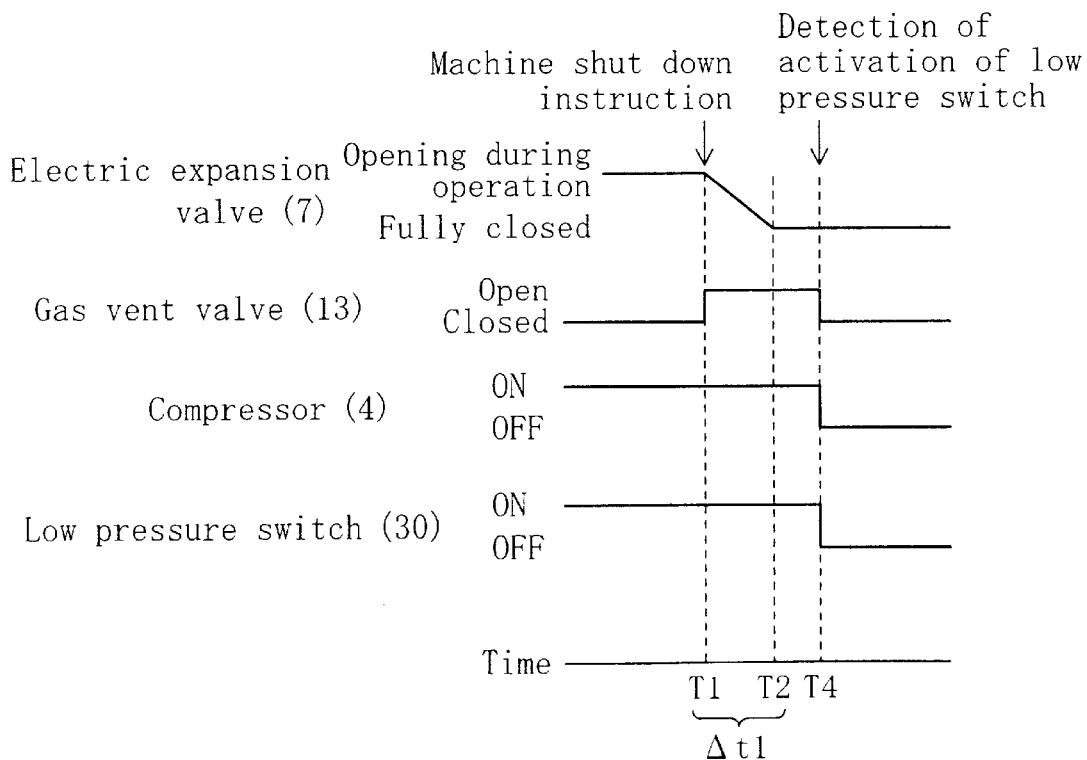
FIG. 3 is a timing chart illustrating a second control operation.

Next, the second control operation will be described with reference to the timing chart of FIG. 3. As the first control operation, the second control operation is a control operation that is applied to both a cooling operation and a heating operation.

In the second control operation, upon receiving a predetermined shut down signal (time T1), the controller (35) opens the gas vent valve (13), and gradually decreases the opening of the electric expansion valve (7) so that it is fully closed after passage of a predetermined time $Δt1$ (time T2). Note that the compressor (4) is left operating.

Then, in the second control operation, the compressor (4) is shut down and the gas vent valve (13) is closed when the low pressure switch (30) is turned ON (time T4), irrespective of the elapsed time.

In this way, the collection of the refrigerant in the indoor unit (2) is continued until the pressure on the low pressure side decreases to a predetermined pressure at which the low pressure switch (30) is activated, whereby it is possible to more reliably reduce the amount of refrigerant remaining in the indoor unit (2).

In order to perform the control operations as described above upon detection of refrigerant leakage, a predetermined sensor (not shown) for detecting leakage of the refrigerant may be provided so that it transmits the shut down signal to the controller (35) upon detection of refrigerant leakage. In this way, the pump down operation is performed immediately upon leakage of the refrigerant.

As described above, according to the first embodiment, the refrigerant of the indoor unit (2) is collected into the outdoor unit (1) and trapped in the outdoor unit (1), whereby it is possible to prevent the room from being filled with the refrigerant even if refrigerant leakage occurs in the indoor unit (2). The refrigerant can be trapped in the outdoor unit (1) without switching the circulation direction of the refrigerant either in a cooling operation or a heating operation, whereby it is possible to suppress refrigerant leakage without decreasing the efficiency of the system and without detracting from the comfort in the room.

The present embodiment provides the effect even when the refrigerant is a non-flammable refrigerant. However, it is especially when the refrigerant is a slightly flammable refrigerant such as R32 or R32/134a that preventing the refrigerant leakage in the room is indispensable. According to the present embodiment, the entire system can be provided at a low cost because an expensive protection device does not have to be provided separately. Therefore, the present system provides particularly significant effects.

Moreover, other than the stop valves (14) and (15), the present system requires no electromagnetic valve to be provided along the communication pipe (3) for performing a pump down operation, thereby facilitating the reduction in the cost of the system.

Variation

Note that in the first control operation described above, there may be a time difference between the time when the electric expansion valve (7) is fully closed and the time when the gas vent valve (13) is closed. Specifically, the compressor (4) may be shut down and the gas vent valve (13) may be closed before the electric expansion valve (7) reaches the fully closed state. Alternatively, the compressor (4) may be shut down and the gas vent valve (13) may be closed after passage of a predetermined time from when the electric expansion valve (7) is fully closed. In such a case, the predetermined time is preferably so short that the refrigerant on the outdoor side will not leak through the gas vent valve (13).

In the second control operation described above, the shut down of the compressor (4) and the closing of the gas vent valve (13) are performed based on the low pressure switch (30) which is provided along the suction side pipe (28). Alternatively, a pressure sensor may be provided along the suction side pipe (28) so that the compressor (4) is shut down and the gas vent valve (13) is closed when the value detected by the pressure sensor becomes less than or equal to a predetermined value.

Exemplary Performance Comparison

Figure 4:
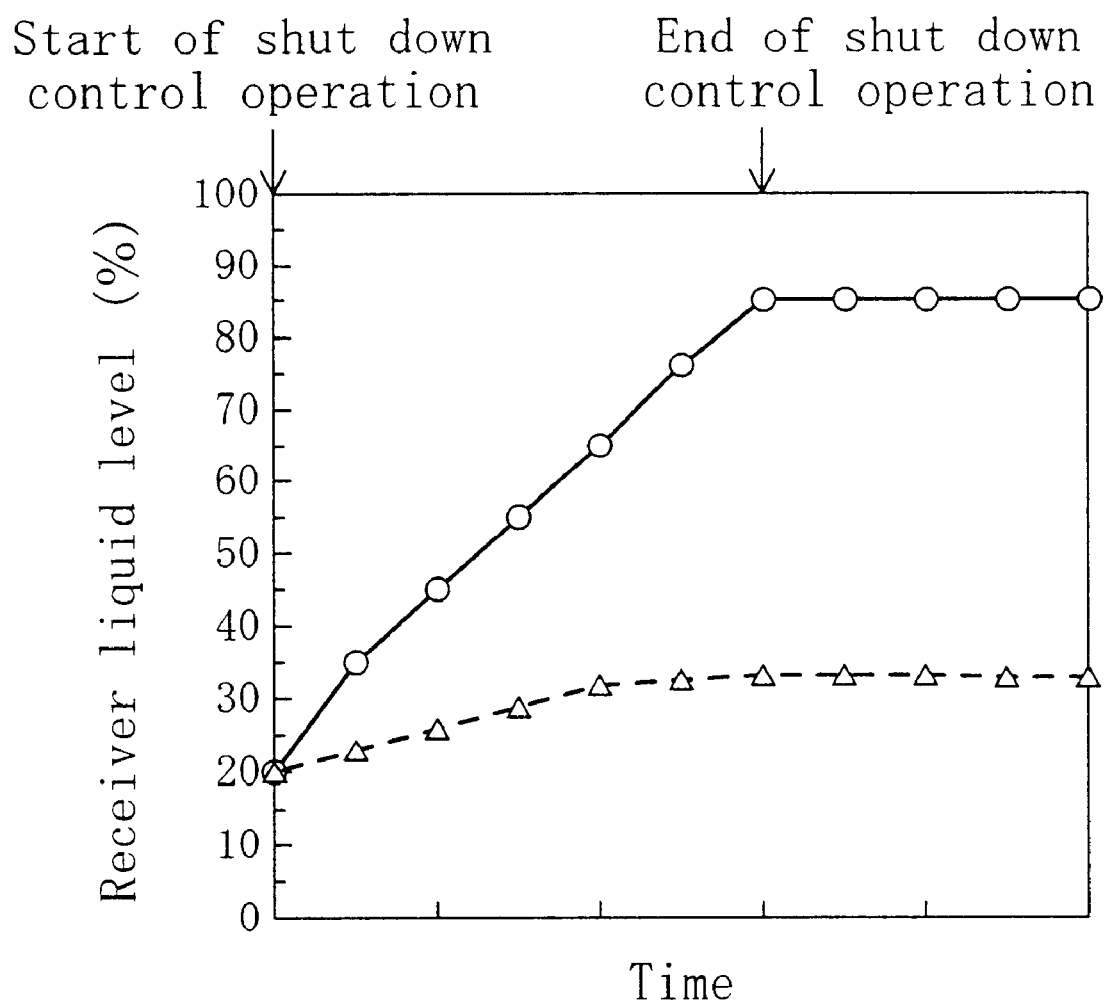
FIG. 4 is a graph showing the change in the receiver liquid level with respect to the elapsed time from the shut down of a compressor.
Figure 12:
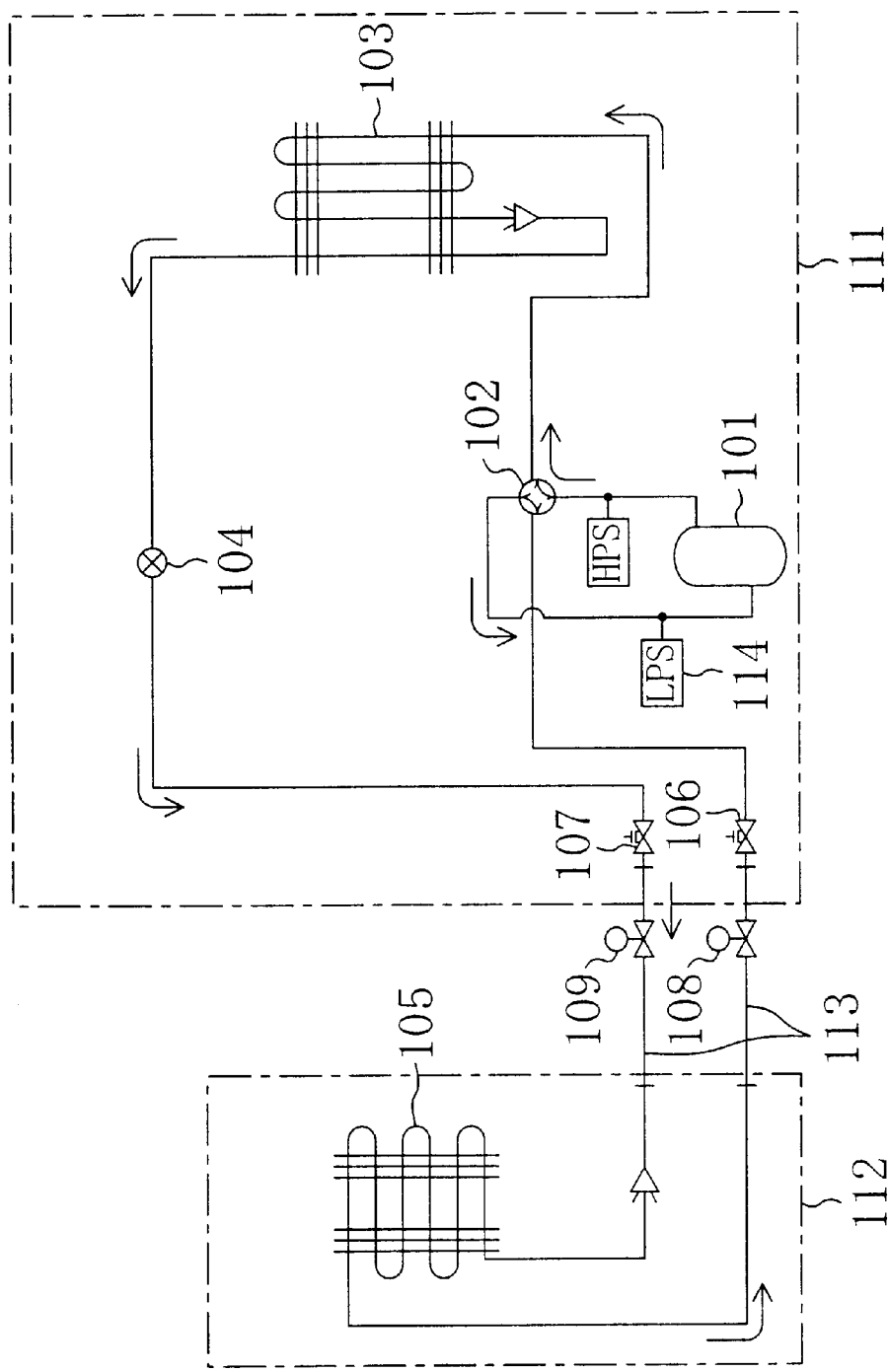
FIG. 12 is a diagram illustrating a configuration of a conventional refrigeration system.

FIG. 4 shows an exemplary performance comparison between a conventional refrigeration system and the refrigeration system of the first embodiment. The conventional refrigeration system used in this comparison is a refrigeration system as illustrated in FIG. 12 except that a receiver is provided on the upstream side of the electric expansion valve. Note that for both of the conventional refrigeration system and the refrigeration system of the first embodiment, the compressor was shut down after passage of a predetermined time from the receipt of the shut down signal, and the systems were compared to each other in terms of the liquid level of the receiver with respect to the elapsed time from the receipt of the shut down signal. From the exemplary performance comparison shown in FIG. 4, it has been shown that the receiver liquid level only increases from 20% to about 33% in the conventional refrigeration system, whereas the receiver liquid level increases from 20% to as high as 85% in the present embodiment because the gas venting operation is performed, indicating that it is possible to trap, in the receiver, an amount of refrigerant about five times as much as that which can be trapped in the receiver in the conventional system.

Second Embodiment

Figure 5:
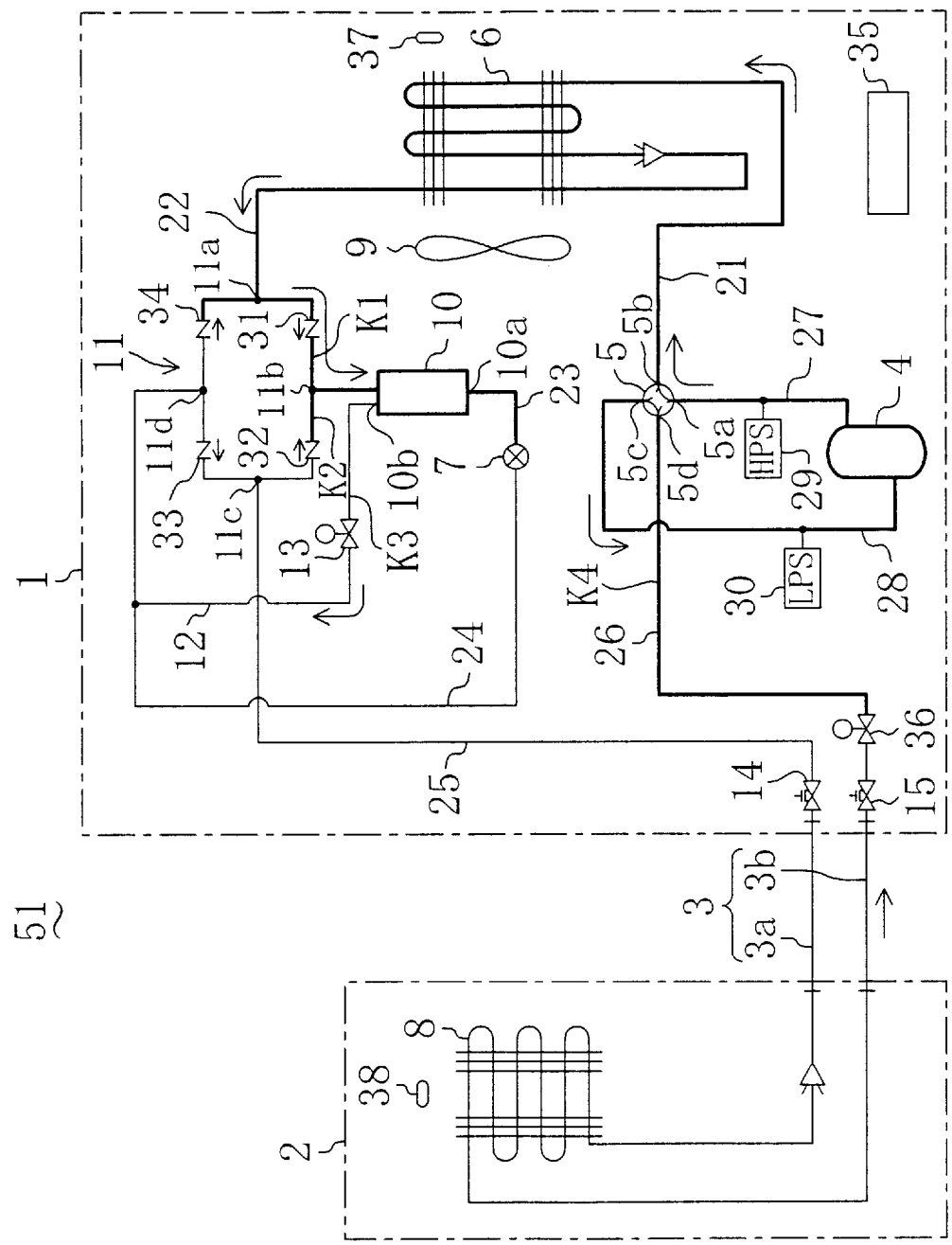
FIG. 5 is a diagram illustrating a configuration of a refrigeration system according to the second embodiment.

As illustrated in FIG. 5, a refrigeration system according to the second embodiment is similar to the refrigeration system according to the first embodiment except that an electromagnetic valve (36) is provided on the outdoor unit (1) side of the second communication pipe (3b). Specifically, the electromagnetic valve (36) is provided along the pipe (26), which connects the four-way switching valve (5) and the stop valve (15) to each other. Note that the electromagnetic valve (36) corresponds to auxiliary opening/closing means (36) as used in the present invention.

When a cooling operation is shut down, the controller (35) first receives a predetermined shut down instruction, and the controller (35) then opens the gas vent valve (13) and gradually closes the electric expansion valve (7) to the fully closed state. Thus, the liquid refrigerant is trapped in the receiver (10) as in the first embodiment.

Then, after passage of a predetermined time, the gas vent valve (13) is closed while the compressor (4) is left operating. Thus, the refrigerant of the indoor unit (2) is trapped not only in the receiver (10) but also in the outdoor heat exchanger (6).

Then, the compressor (4) is shut down based on a predetermined condition such as passage of a predetermined time or activation of the low pressure switch (30). Upon shut down of the compressor (4), the electromagnetic valve (36) is closed. Thus, the liquid side of the outdoor unit (1) is enclosed by the first check valve (31) and the second check valve (32) of the bridge circuit (11), the electric expansion valve (7) and the gas vent valve (13), while the gas side thereof is enclosed by the electromagnetic valve (36), whereby the refrigerant is enclosed in the following elements of the outdoor unit (1): the receiver (10), the outdoor heat exchanger (6), the compressor (4) and the pipes (12, 21, 22, 23, 26, 27, 28) connecting these elements to one another. Therefore, the refrigerant is trapped in a wider area of the outdoor unit (1), whereby it is possible to further reduce the amount of refrigerant remaining in the indoor unit (2).

On the other hand, when a heating operation is shut down, the controller (35) first receives a predetermined shut down instruction, and the controller (35) then opens the gas vent valve (13) and gradually closes the electric expansion valve (7) to the fully closed state. Thus, the liquid refrigerant is trapped in the receiver (10) as in the first embodiment.

Then, the compressor (4) is shut down, while leaving the gas vent valve (13) open, based on a predetermined condition such as passage of a predetermined time or activation of the low pressure switch (30). Thus, the compressor (4) is shut down while the gas vent valve (13) is left open. At this time, the outdoor fan (9) is left operating. Thus, the pressure difference based on the temperature difference between the indoor side and the outdoor side serves as a driving force that causes a natural circulation of the refrigerant in which the refrigerant remaining in the indoor unit (2) flows into the outdoor unit (1). Moreover, the operation of the outdoor fan (9) promotes the heat transfer in the outdoor heat exchanger (6), and promotes the condensation of the gas refrigerant in the outdoor heat exchanger (6). Thus, the natural circulation described above is promoted. Therefore, the refrigerant in the indoor unit (2) is more easily collected into the outdoor unit (1).

Then, upon satisfaction of a predetermined condition under which it is expected that a predetermined amount of refrigerant has been collected in the outdoor heat exchanger (6) (e.g., passage of a predetermined time from the shut down of the compressor (4)), the electromagnetic valve (36) and the gas vent valve (13) are closed, and the outdoor fan (9) is shut down. Thus, the refrigerant is enclosed in the following elements of the outdoor unit (1) (indicated by a bold line in FIG. 5): the receiver (10), the outdoor heat exchanger (6), the compressor (4), and the pipes (12, 21, 22, 23, 26, 27, 28) connecting these elements to one another.

In other words, the refrigerant is trapped in the receiver (10), the path (23) extending from the receiver (10) to the expansion valve (7), the path (K1) extending from the first check valve (31) to the receiver (10), the path (K2) extending from the second check valve (32) to the receiver (10), the path (K3) along the gas vent pipe (12) extending from the receiver (10) to the gas vent valve (13), and a path (k4) extending from the outdoor heat exchanger (6) to the electromagnetic valve (36).

Therefore, according to the second embodiment, the refrigerant can be trapped in a wider area of the outdoor unit (1), whereby it is possible to further reduce the amount of refrigerant remaining in the indoor unit (2). Therefore, where a slightly flammable refrigerant is used as the refrigerant, it is possible to further improve the safety of the system. Moreover, it is possible to reduce the size of the receiver (10).

First Variation

Note that when the heating operation is shut down as described above, the following control operation may be performed depending on the type of the compressor (4).

When the compressor (4) is a so-called "high pressure dome type" compressor, i.e., when it has a structure such that the refrigerating machine oil stays in the high-pressure-side portion in the compressor (4), the pressure of the refrigerating machine oil rapidly decreases and the to saturation solubility of the refrigerant to the refrigerating machine oil decreases upon shut down of the compressor (4). Therefore, the refrigerant which has been dissolved in the refrigerating machine oil may come out through a foaming phenomenon and flow into the indoor unit (2) through the discharge side pipe (27), the four-way switching valve (5), the pipe (26) and the second communication pipe (3b). Thus, when the compressor (4) is a high pressure dome type compressor, the electromagnetic valve (36) may be closed upon shut down of the compressor (4).

In this way, it is possible to prevent the refrigerant dissolved in the refrigerating machine oil from flowing into the indoor unit (2) through foaming.

On the other hand, when the compressor (4) is a so-called "low pressure dome type" compressor, the solubility of the refrigerant to the refrigerating machine oil increases upon shut down of the compressor (4). In such a case, the refrigerant tends to be dissolved in the refrigerating machine oil. Therefore, when the compressor (4) is a low pressure dome type compressor, the four-way switching valve (5) may be switched so as to connect the third port (5c) and the fourth port (5d) to each other upon shut down of the compressor (4). Thus, a part of the refrigerant of the indoor unit (2) is dissolved in the refrigerating machine oil, whereby it is possible to more efficiently collect the refrigerant into the indoor unit (2).

As described above, upon shut down of the compressor (4), the refrigerant can be more efficiently collected by modifying the control method while determining the solubility of the refrigerant to the refrigerating machine oil based on the type of the compressor, the temperature and/or pressure of the refrigerating machine oil, the type of the refrigerant, the type of the refrigerating machine oil, etc.

Second Variation

In the second embodiment described above, when a heating operation is shut down, the electromagnetic valve (36) and the gas vent valve (13) are closed while simultaneously shutting down the outdoor fan (9). However, if the indoor side temperature is higher than the outdoor side temperature, the pressure difference in the circuit based on the temperature difference serves as a driving force that causes a natural circulation of the refrigerant in which the refrigerant in the indoor unit (2) flows into the outdoor unit (1) side.

In view of this, the outdoor unit (1) may be provided with an outdoor temperature sensor (37) for detecting the outdoor air temperature as outdoor temperature detection means for detecting the outdoor side temperature, while the indoor unit (2) is provided with an indoor temperature sensor (38) for detecting the indoor air temperature as indoor temperature detection means for detecting the indoor side temperature, so that the time at which to close the electromagnetic valve (36) and the gas vent valve (13) is determined based on the values detected by the sensors (37) and (38).

Specifically, upon receiving a shut down instruction, the controller (35) opens the gas vent valve (13) and gradually closes the electric expansion valve (7) to the fully closed state. Then, the compressor (4) is shut down based on a predetermined condition while maintaining the opening of the gas vent valve (13) and leaving the outdoor fan (9) operating based on a predetermined condition. Then, upon satisfaction of a predetermined condition under which it is expected that a predetermined amount of refrigerant has been collected in the outdoor heat exchanger (6), the outdoor fan (9) is shut down. Then, the outdoor air temperature detected by the outdoor temperature sensor (37) and the indoor air temperature detected by the indoor temperature sensor (38) are compared to each other, and the electromagnetic valve (36) and the gas vent valve (13) are closed when the indoor air temperature becomes less than or equal to the outdoor air temperature.

In this way, the natural circulation of the refrigerant can be maximally utilized, whereby it is possible to further increase the amount of refrigerant to be collected into the outdoor unit (1).

Note that the temperature detection means for detecting the outdoor side temperature and the indoor side temperature are not limited to the outdoor temperature sensor (37) and the indoor temperature sensor (38), but may alternatively be thermistors (not shown) provided in the outdoor heat exchanger (6) and the indoor heat exchanger (8). Thus, the temperature detection means is not limited to a sensor for detecting an air temperature, but may be any sensor that is capable of detecting the temperature difference between the refrigerant in the outdoor unit (1) and the refrigerant in the indoor unit (2). As described above, the temperature difference detection means for detecting the temperature difference between the indoor side and the outdoor side may be either means for detecting the air temperature difference between the indoor side and the outdoor side or means for detecting the difference in the refrigerant temperature or the difference in the temperature of the refrigerant pipes, etc., between the indoor side and the outdoor side.

Third Variation

The electromagnetic valve (36) may be a valve that can be manually opened/closed, and the electromagnetic valve (36) may by used also as the opening/closing valve for enclosing the outdoor unit (1) before connecting the outdoor unit (1) and the indoor unit (2) to each other. Thus, the stop valve (15) illustrated in FIG. 5 may be omitted.

Figure 6:
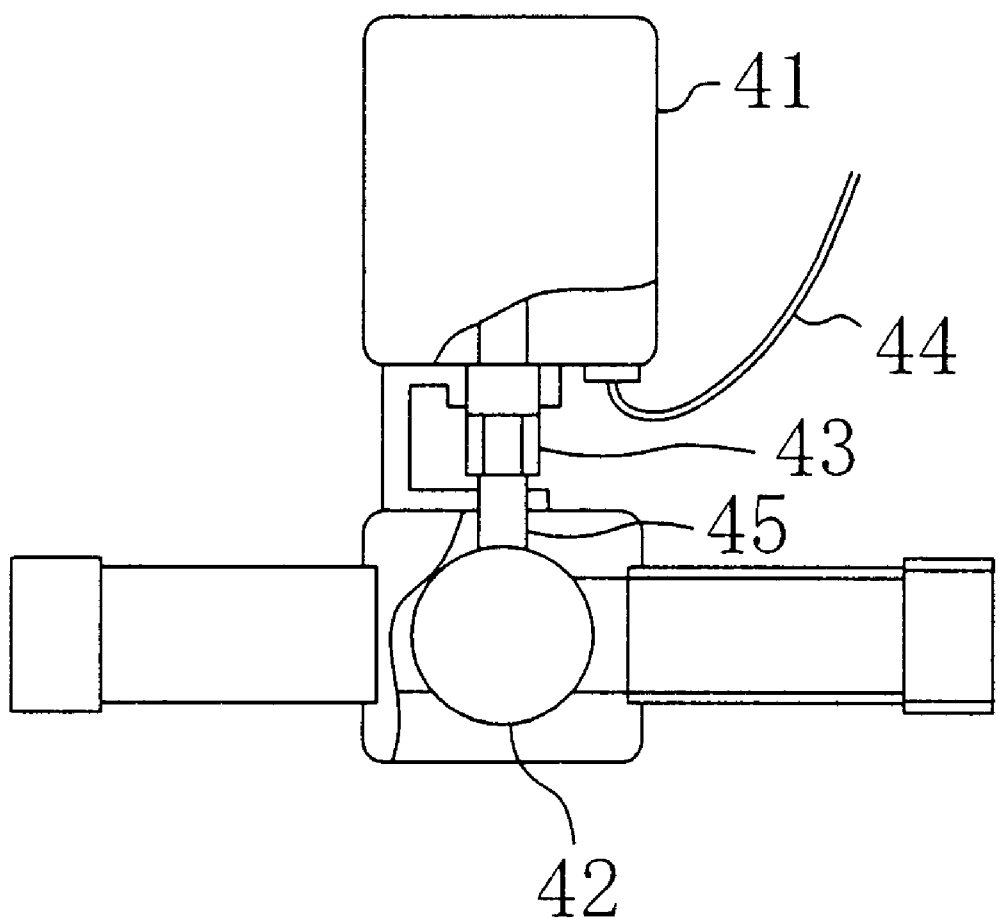
FIG. 6 is a partially-cut-away side view illustrating an electric ball valve.

As the electromagnetic valve (36) which can be manually opened/closed, an electric ball valve (40) illustrated in FIG. 6 may be used, for example. The electric ball valve (40) includes a ball valve (42), a motor (41) for opening/closing the ball valve (42), and a cable (44) for transmitting a control signal from the controller (35). Moreover, there is provided a nut (43) having a hexagonal cross section which is connected to a motor shaft (45) so that the ball valve (42) can be manually opened/closed. Thus, with this electric ball valve (40), the open/closed state of the ball valve (42) can be forcibly adjusted by rotating the nut (43) by using a tool such as a spanner.

Therefore, by using the electric ball valve (40) as described above, the stop valve (15) can be omitted so as to reduce the cost of the system. Moreover, since a ball valve has a low fluid resistance, the pressure loss of the refrigerant during a normal cooling operation and a normal heating operation is reduced, thereby improving the efficiency of the system. Moreover, the refrigerant is collected smoothly.

Third Embodiment

A refrigeration system according to the third embodiment is similar to the refrigeration system according to the first embodiment except that a check valve (46) for allowing only a refrigerant flow in the discharge direction is provided along the discharge side pipe (27) of the compressor (4).

When a cooling operation is shut down, the controller (35) first receives a predetermined shut down instruction, and the controller (35) then opens the gas vent valve (13) and gradually closes the electric expansion valve (7) to the fully closed state. Thus, the liquid refrigerant is trapped in the receiver (10) as in the first embodiment.

Then, the compressor (4) is shut down and the gas vent valve (13) is closed based on a predetermined condition such as passage of a predetermined time or activation of the low pressure switch (30).

Figure 7:
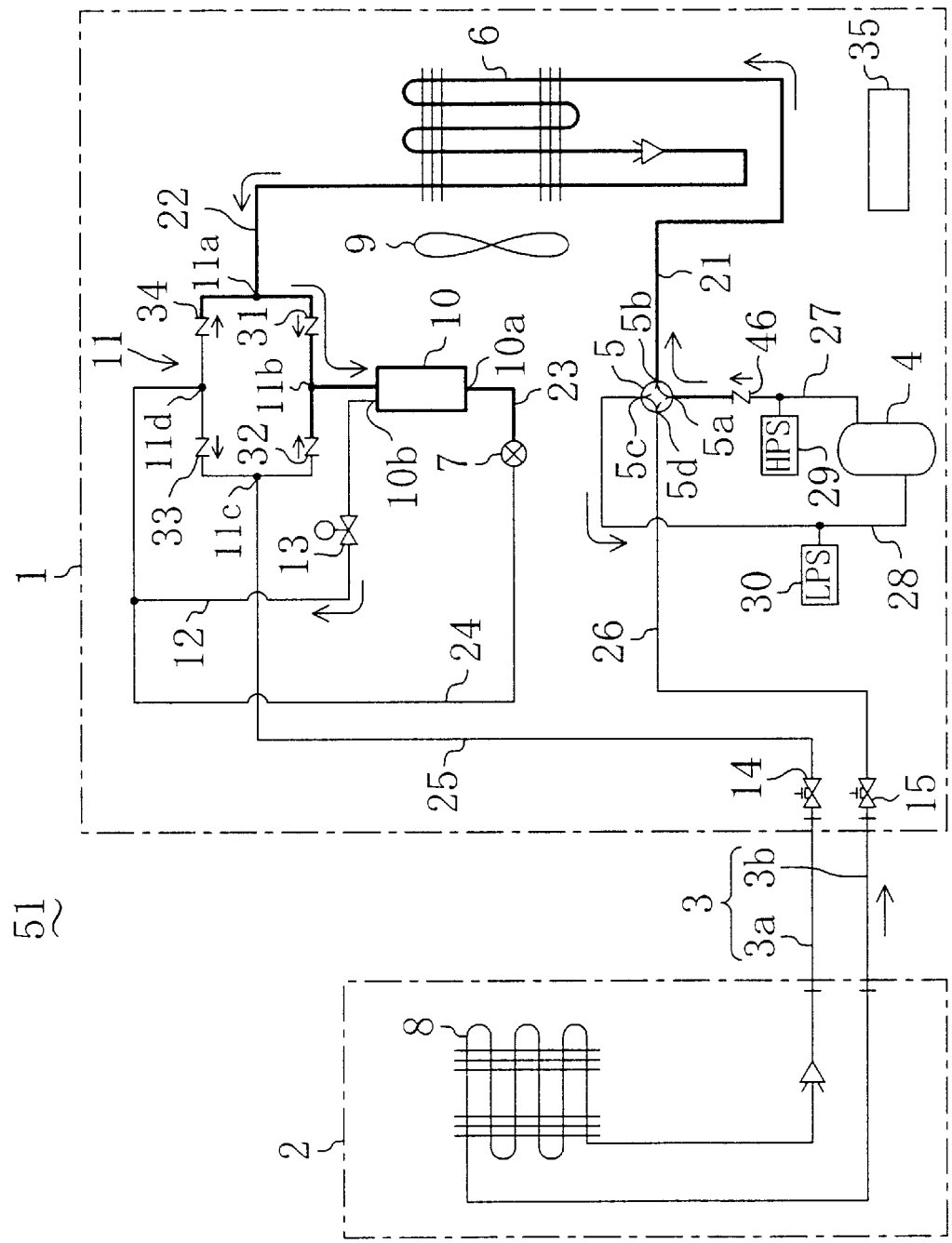
FIG. 7 is a diagram illustrating a configuration of a refrigeration system according to the third embodiment.

Therefore, in the outdoor unit (1), an enclosed section (indicated by a bold line in FIG. 7) is provided, in which one end thereof is closed by the gas vent valve (13) and the other end thereof is closed by the check valve (46). Thus, the refrigerant of the indoor unit (2) is collected into the indoor unit (2) and enclosed in the enclosed section. Specifically, the refrigerant is enclosed in the following elements of the outdoor unit (1): the receiver (10), the outdoor heat exchanger (6), and the pipes (21, 22, 23, 27) connecting these elements to one another.

On the other hand, when a heating operation is shut down, the controller (35) first receives a shut down instruction, and the controller (35) then opens the gas vent valve (13) and gradually closes the electric expansion valve (7) to the fully closed state, as when a cooling operation is shut down. Thus, the liquid refrigerant is trapped in the receiver (10). Then, the compressor (4) is shut down based on a predetermined condition. Where the four-way switching valve (5) is a four-way switching valve with external pressure equalization, the first port (5a) and the second port (5b) are connected to each other by switching the four-way switching valve (5) while there is a pressure difference sufficient for the switching operation. Note that even after the compressor (4) is shut down, the opening of the gas vent valve (13) is maintained and the outdoor fan (9) is left operating.

Then, upon satisfaction of a predetermined condition under which it is expected that a predetermined amount of refrigerant has been trapped in the outdoor heat exchanger (6), the gas vent valve (13) is closed and the outdoor fan (9) is shut down.

As described above, according to the third embodiment, effects as those of the second embodiment can be obtained only by providing the check valve (46) instead of the electromagnetic valve (36). Since the check valve (46) is less expensive than the electromagnetic valve (36), it is possible to further reduce the cost of the system.

Variation

Figure 8:
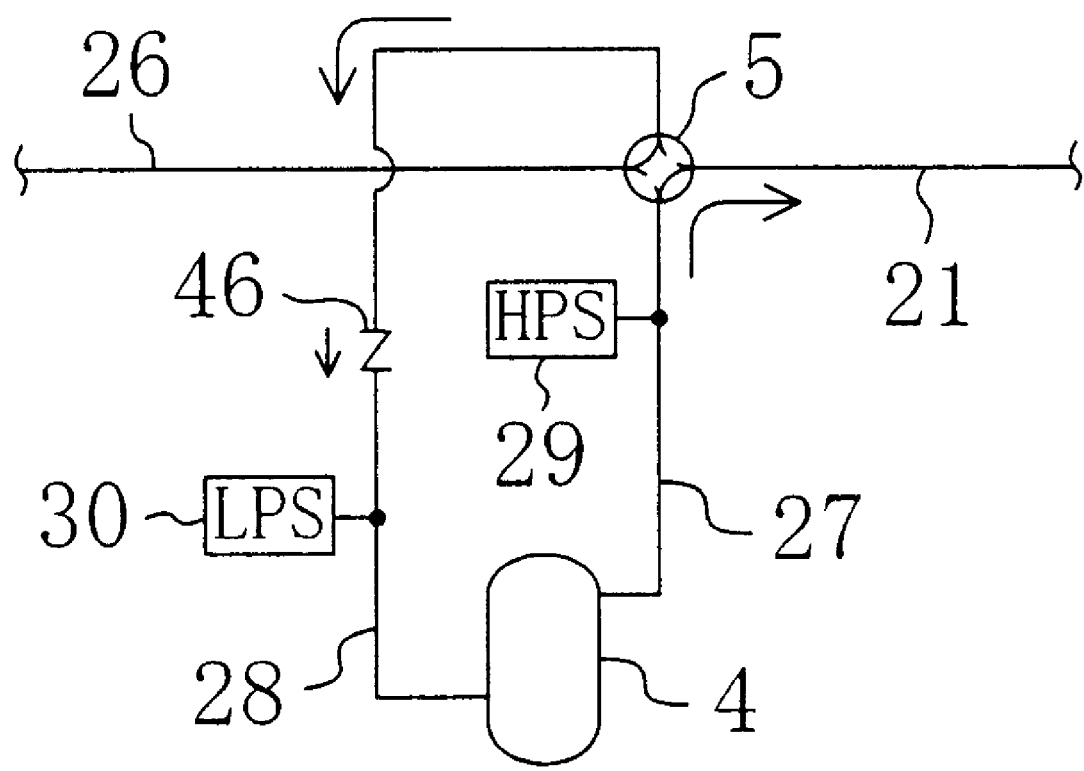
FIG. 8 is a diagram illustrating a refrigerant circuit in the vicinity of a compressor according to a variation of the third embodiment.

Note that the check valve (46) for enclosing the refrigerant may be provided along the suction side pipe (28) of the compressor (4), as illustrated in FIG. 8, instead of providing it along the discharge side pipe (27) of the compressor (4). Note that where the check valve (46) is provided along the suction side pipe (28), the check valve (46) is arranged so as to only allow a refrigerant flow in the suction direction. In such a case, the refrigerant is trapped in the compressor (4) as well as in the receiver (10) and the outdoor heat exchanger (6) of the outdoor unit (1).

Note that while the check valve (46) is provided separately from the compressor (4) in the third embodiment and the variation thereof, it is not necessary to separately provide the check valve (46) if the compressor to be used includes a backflow preventing mechanism, such as a check valve, provided therein.

Alternative Embodiments

Figure 9:
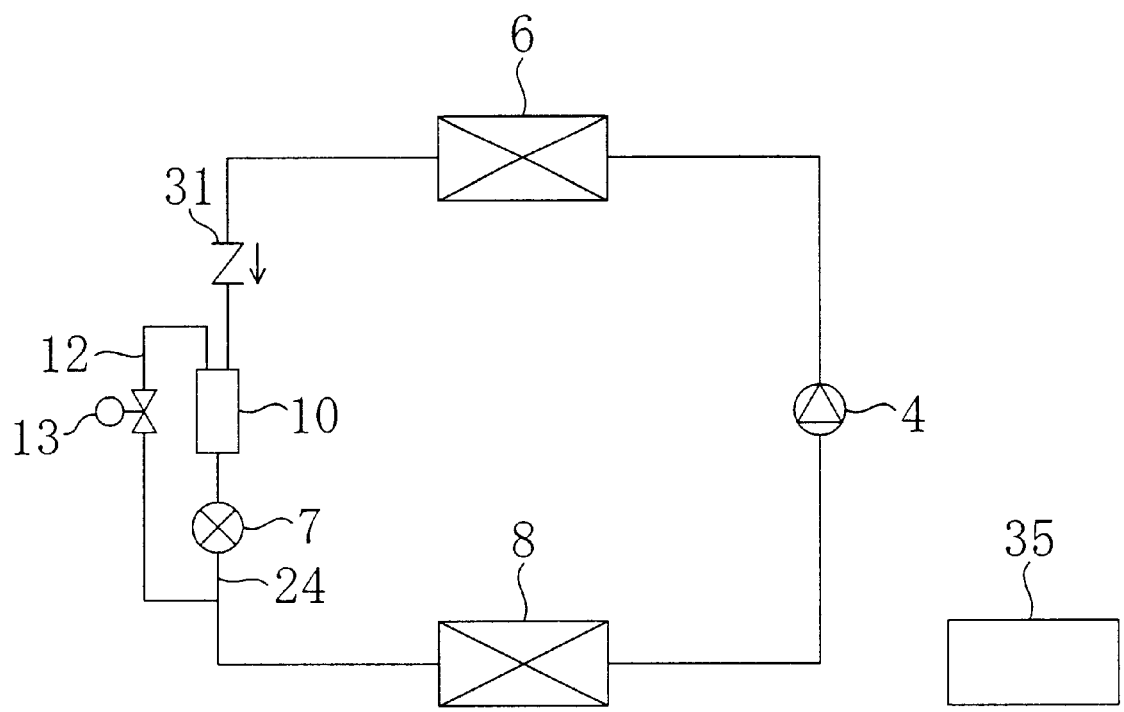
FIG. 9 is a diagram illustrating a configuration of a refrigeration system according to an alternative embodiment.

While the circulation direction of the refrigerant is reversible in each of the embodiments described above, the present invention may be applied to a system, such as a cooling only system, in which the circulation direction of the refrigerant is constant. For example, the system may have a configuration as illustrated in FIG. 9, in which the compressor (4), the outdoor heat exchanger (6), the electric expansion valve (7) and the indoor heat exchanger (8) are connected to one another by a refrigerant pipe, while the first check valve (31) and the receiver (10) are arranged in this order between the outdoor heat exchanger (6) and the electric expansion valve (7), with the gas vent pipe (12) being provided for connecting the receiver (10) to the pipe (24) downstream of the electric expansion valve (7). Moreover, as in the embodiment described above, auxiliary opening/closing means that is always opened during a normal operation may be provided upstream of the receiver (10). The auxiliary opening/closing means may be provided in addition to, or in place of, the first check valve (31).

Figure 10:
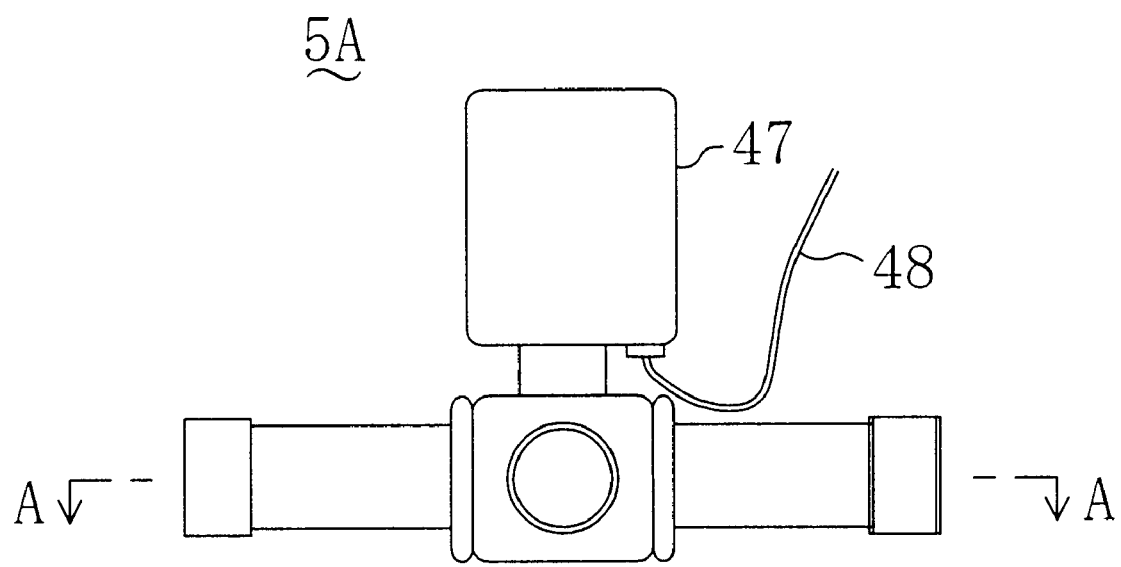
FIG. 10 is a side view illustrating an electric ball-valve-type four-way switching valve.

While any of various types of four-way switching valves, such as a four-way switching valve with external pressure equalization and a four-way switching valve with internal pressure equalization, may be used as the four-way switching valve (5) in the embodiments described above, it is preferred to use an electric ball-valve-type four-way switching valve (5A) as illustrated in FIG. 10. Note that the electric ball-valve-type four-way switching valve (5A) is configured so that a ball valve (49) is rotated by a motor (47), and has a characteristic that there is very little refrigerant leakage between non-connected ports.

Figure 11A:
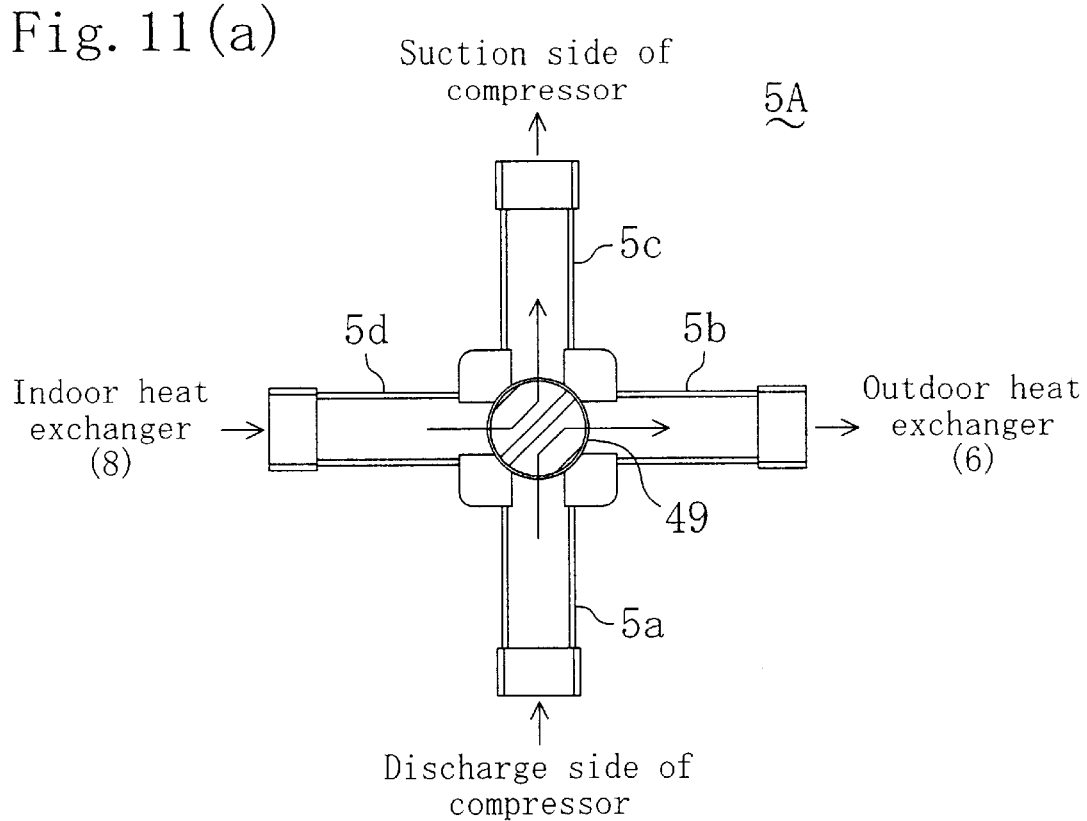
FIG. 11(a) illustrates a state during a cooling operation.
Figure 11B:
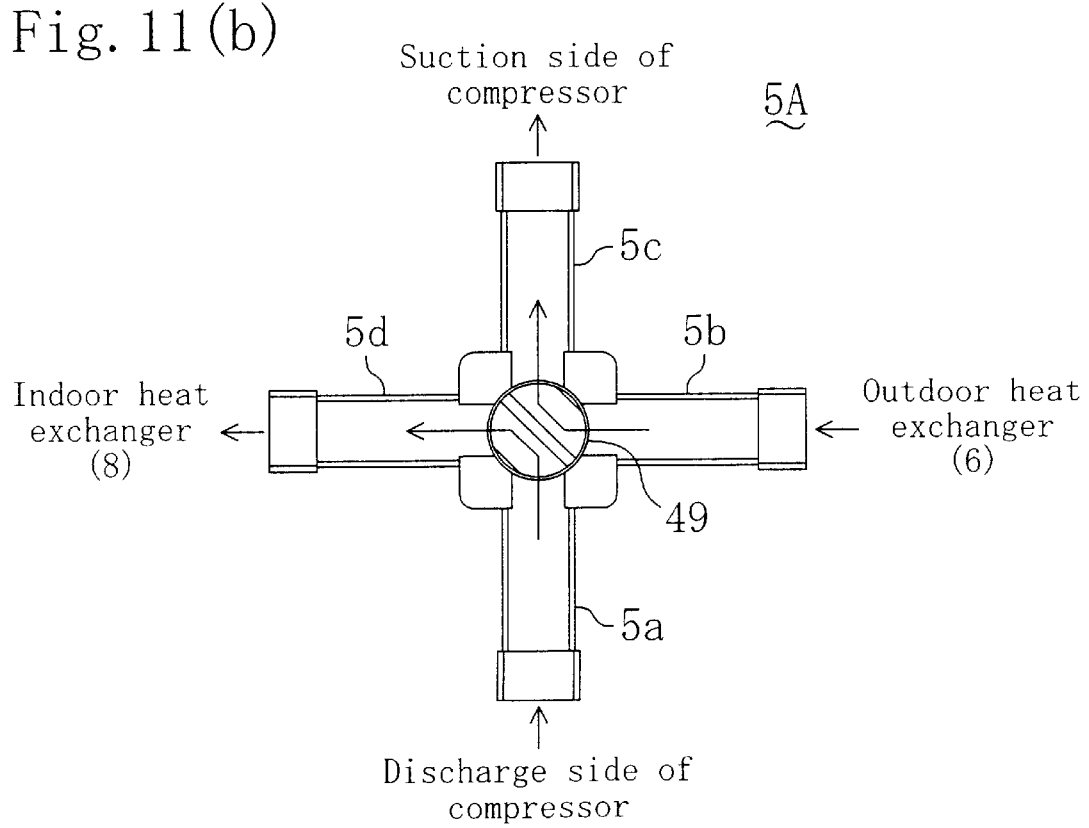
FIG. 11(b) illustrates a state during a heating operation.

In a cooling operation, the ball valve (49) is set in a position as illustrated in FIG. 11(a), whereby the first port (5a) and the second port (5b) are connected to each other while the third port (5c) and the fourth port (5d) are connected to each other. In a heating operation, on the other hand, the ball valve (49) is rotated as illustrated in FIG. 11(b), whereby the first port (5a) and the fourth port (5d) are connected to each other while the second port (5b) and the third port (5c) are connected to each other.

With the electric ball-valve-type four-way switching valve (5A), substantially no refrigerant leakage occurs from the high pressure side to the low pressure side. Therefore, even when the indoor side air temperature is lower than the outdoor side air temperature, it is possible to reliably prevent the refrigerant from moving from the outdoor unit (1) to the indoor unit (2). Therefore, it is possible to reliably prevent the refrigerant, which has once been collected into the outdoor unit (1), from flowing into the indoor unit (2), and thus to further improve the safety.

Note that the term "refrigeration system" as used herein is not limited to refrigeration systems in its narrow sense, but rather refers to refrigeration systems in its broad sense, including air conditioners, refrigerators, etc.

INDUSTRIAL APPLICABILITY

As described above, the present invention is useful for refrigeration systems such as an air conditioner and a freezer/refrigerator.

What is claimed is:

1. A refrigeration system, comprising:

an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed;

an indoor unit (2) including an indoor heat exchanger (8); and a communication pipe (3) for connecting the outdoor unit (1) and the indoor unit (2) to each other, wherein:

the outdoor unit (1) includes:
- a receiver (10) provided upstream of the expansion valve (7);
- a gas vent passageway (12) for connecting the receiver (10) and a downstream side pipe (24) of the expansion valve (7) to each other;
- gas vent opening/closing means (13) provided along the gas vent passageway (12); and
- a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); and the refrigeration system further comprises control means (35) for, before shutting down the compressor (4), opening the gas vent opening/closing means (13) and closing the expansion valve (7) while the compressor (4) is left operating, and for closing the gas vent opening/closing means (13) upon subsequent shut down of the compressor (4).

2. A refrigeration system, comprising:

an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed;

an indoor unit (2) including an indoor heat exchanger (8); and a communication pipe (3) for connecting the outdoor unit (1) and the indoor unit (2) to each other, wherein:

the outdoor unit (1) includes:
- a receiver (10) provided upstream of the expansion valve (7);
- a gas vent passageway (12) for connecting the receiver (10) and a downstream side pipe (24) of the expansion valve (7) to each other;
- gas vent opening/closing means (13) provided along the gas vent passageway (12); and
- a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6);

auxiliary opening/closing means (36) which is always opened during a normal operation is provided on an outdoor side of a gas side pipe (26) extending from the indoor unit (2) to the flow path switching mechanism (5); and the refrigeration system further comprises control means (35) for, before shutting down the compressor (4) in a cooling operation, opening the gas vent opening/closing means (13) and closing the expansion valve (7) while the compressor (4) is left operating, and for closing the gas vent opening/closing means (13) and the auxiliary opening/closing means (36) upon subsequent shut down of the compressor (4).

3. A refrigeration system, comprising:

an outdoor unit (1) including a compressor (4), a flow path switching mechanism (5) for switching a circulation direction of a refrigerant discharged from the compressor (4), an outdoor heat exchanger (6), and an expansion valve (7) capable of being fully closed;

an indoor unit (2) including an indoor heat exchanger (8); and a communication pipe (3) for connecting the outdoor unit (1) and the indoor unit (2) to each other, wherein:

the outdoor unit (1) includes:
- a receiver (10) provided upstream of the expansion valve (7);
- a gas vent passageway (12) for connecting the receiver (10) and a downstream side pipe (24) of the expansion valve (7) to each other;
- gas vent opening/closing means (13) provided along the gas vent passageway (12); and
- a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6);

auxiliary opening/closing means (36) which is always opened during a normal operation is provided on an outdoor side of a gas side pipe (26) extending from the indoor unit (2) to the flow path switching mechanism (5);

the refrigeration system further comprises temperature difference detection means (37, 38) for detecting a temperature difference between an indoor side and an outdoor side; and the refrigeration system further comprises control means (35) for, before shutting down the compressor (4) in a heating operation, opening the gas vent opening/closing means (13) and closing the expansion valve (7) while the compressor (4) is left operating, and for closing the gas vent opening/closing means (13) and the auxiliary opening/closing means (36) when an outdoor temperature becomes equal to or greater than an indoor temperature after subsequent shut down of the compressor (4).

4. The refrigeration system of claim 2 or 3, wherein the auxiliary opening/closing means (36) is configured so that the auxiliary opening/closing means (36) can be manually opened/closed, and is used also as a stop valve (15) for closing the outdoor unit (1) before connecting the outdoor unit (1) to the indoor unit (2).

5. A refrigeration system, comprising a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further comprising:

a receiver (10) provided upstream of the expansion valve (7);

a gas vent passageway (12) for connecting the receiver (10) and a downstream side pipe (24) of the expansion valve (7) to each other;

gas vent opening/closing means (13) provided along the gas vent passageway (12); and a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6), wherein:

at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; and a path (K3) along the gas vent passageway (12) extending from the receiver (10) to the gas vent opening/closing means (13); and the refrigeration system further comprises control means (35) for, before shutting down the compressor (4), opening the gas vent opening/closing means (13) and closing the expansion valve (7) while the compressor (4) is left operating, and for closing the gas vent opening/closing means (13) upon subsequent shut down of the compressor (4).

6. A refrigeration system, comprising a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further comprising:

a receiver (10) provided upstream of the expansion valve (7);

a gas vent passageway (12) for connecting the receiver (10) and a downstream side pipe (24) of the expansion valve (7) to each other;

gas vent opening/closing means (13) provided along the gas vent passageway (12);

a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6); and auxiliary opening/closing means (36) provided on an outdoor side of a gas side pipe (26) extending from indoor heat exchanger (8) to the flow path switching mechanism (5), the auxiliary opening/closing means (36) being always opened during a normal operation, wherein:

at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further comprises control means (35) for, before shutting down the compressor (4), opening the gas vent opening/closing means (13) and closing the expansion valve (7) while the compressor (4) is left operating, and for closing the gas vent opening/closing means (13) and the auxiliary opening/closing means (36) upon subsequent shut down of the compressor (4).

7. A refrigeration system, comprising a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further comprising:

a receiver (10) provided upstream of the expansion valve (7);

a gas vent passageway (12) for connecting the receiver (10) and a downstream side pipe (24) of the expansion valve (7) to each other;

gas vent opening/closing means (13) provided along the gas vent passageway (12);

a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6);

auxiliary opening/closing means (36) provided on an outdoor side of a gas side pipe (26) extending from indoor heat exchanger (8) to the flow path switching mechanism (5), the auxiliary opening/closing means (36) being always opened during a normal operation; and temperature difference detection means (37, 38) for detecting a temperature difference between an indoor side and an outdoor side, wherein:

at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further comprises control means (35) for, before shutting down the compressor (4) in a heating operation, opening the gas vent opening/closing means (13) and closing the expansion valve (7) while the compressor (4) is left operating, and for closing the gas vent opening/closing means (13) and the auxiliary opening/closing means (36) when an outdoor temperature becomes equal to or greater than an indoor temperature after subsequent shut down of the compressor (4).

8. A refrigeration system, comprising a compressor (4), a flow path switching mechanism (5) for switching a circulation direction of a refrigerant discharged from the compressor (4), an outdoor heat exchanger (6), an expansion valve (7) capable of being fully closed, and an indoor heat exchanger (8), which are connected to one another by a refrigerant pipe, the refrigeration system further comprising:

a receiver (10) provided upstream of the expansion valve (7);

a gas vent passageway (12) for connecting the receiver (10) and a downstream side pipe (24) of the expansion valve (7) to each other;

gas vent opening/closing means (13) provided along the gas vent passageway (12);

a bridge circuit (11), wherein during a cooling operation, the bridge circuit (11) only allows a refrigerant flow in such a direction as to lead the refrigerant, which has been condensed through the outdoor heat exchanger (6), to the receiver (10) and a refrigerant flow in such a direction as to lead the refrigerant, which has been depressurized through the expansion valve (7), to the indoor heat exchanger (8), and during a heating operation, the bridge circuit (11) only allows a refrigerant flow in such a direction as to lead the refrigerant, which has been condensed through the indoor heat exchanger (8), to the receiver (10) and a refrigerant flow in such a direction as to lead the refrigerant, which has been depressurized through the expansion valve (7), to the outdoor heat exchanger (6);

auxiliary opening/closing means (36) provided on an outdoor side of a gas side pipe (26) extending from indoor heat exchanger (8) to the flow path switching mechanism (5), the auxiliary opening/closing means (36) being always opened during a normal operation; and an outdoor fan (9) for supplying an air to the outdoor heat exchanger (6), wherein:

at least the following elements are provided on an outdoor side: the receiver (10); a path (23) extending from the receiver (10) to the expansion valve (7); a path (K1) extending from a circuit section in the bridge circuit (11) to the receiver (10), the circuit section only allowing a refrigerant flow in such a direction as to lead the refrigerant, which has been condensed through the outdoor heat exchanger (6), to the receiver (10) during a cooling operation; a path (K2) extending from a circuit section in the bridge circuit (11) to the receiver (10), the circuit section only allowing a refrigerant flow in such a direction as to lead the refrigerant, which has been condensed through the indoor heat exchanger (8), to the receiver (10) during a heating operation; a path (K3) along the gas vent passageway (12) extending from the receiver (10) to the gas vent opening/closing means (13); and a path (k4) extending from the outdoor heat exchanger (6) to the auxiliary opening/closing means (36); and the refrigeration system further comprises control means (35) for, before shutting down the compressor (4) in a heating operation, opening the gas vent opening/closing means (13) and closing the expansion valve (7) while the compressor (4) is left operating, for closing the auxiliary opening/closing means (36) upon subsequent shut down of the compressor (4), and for closing the gas vent opening/closing means (13) upon shut down of the outdoor fan (9).

9. The refrigeration system of any one of claims 1 to 3 and 5 to 8, wherein the bridge circuit (11) comprises:

a first check valve (31) for allowing only a refrigerant flow running in a direction from a first connection terminal (11a) connected to the outdoor heat exchanger (6) to a second connection terminal (11b) connected to the receiver (10);

a second check valve (32) for allowing only a refrigerant flow running in a direction from a third connection terminal (11c) connected to the indoor heat exchanger (8) to the second connection terminal (11b);

a third check valve (33) for allowing only a refrigerant flow running in a direction from a fourth connection terminal (11d) connected to a downstream side pipe (24) of the expansion valve (7) to the third connection terminal (11c); and a fourth check valve (34) for allowing only a refrigerant flow running in a direction from the fourth connection terminal (11d) to the first connection terminal (11a).

10. The refrigeration system of any one of claims 1 to 3 and 5 to 8, wherein the flow path switching mechanism (5) is an electric ball-valve-type four-way switching valve (5A).

11. The refrigeration system of any one of claims 2, 3, and 6 to 8, wherein the auxiliary opening/closing means (36) is an electric ball valve (40).

12. The refrigeration system of any one of claims 1 to 3 and 5 to 8, wherein the control means (35) is configured so as to shut down the compressor (4) when a fully closed state of the expansion valve (7) has continued for a predetermined period of time.

13. The refrigeration system of any one of claims 1 to 3 and 5 to 8, wherein:

a low pressure switch (30) is provided along a suction side pipe (28) of the compressor (4); and the control means (35) is configured so as to shut down the compressor (4) when the low pressure switch (30) is activated.

14. The refrigeration system of any one of claims 1 to 3 and 5 to 8, wherein the refrigerant includes a flammable refrigerant.

* * * * *